US 10,589,562 B2

(12) United States Patent
Kaneda et al.

(10) Patent No.: US 10,589,562 B2
(45) Date of Patent: Mar. 17, 2020

(54) POSITION POINTER

(71) Applicant: Wacom Co., Ltd., Saitama (JP)

(72) Inventors: Takenori Kaneda, Tochigi (JP);
Hiroyuki Fujitsuka, Saitama (JP)

(73) Assignee: Wacom Co., Ltd., Saitama (JP)

(*) Notice: Subject to any disclaimer, the term of this patent is extended or adjusted under 35 U.S.C. 154(b) by 156 days.

(21) Appl. No.: 15/646,647

(22) Filed: Jul. 11, 2017

(65) Prior Publication Data

US 2017/0341458 A1     Nov. 30, 2017

Related U.S. Application Data

(63) Continuation of application No. PCT/JP2016/050623, filed on Jan. 12, 2016.

(30) Foreign Application Priority Data

Jan. 30, 2015 (JP) ................................. 2015-016973

(51) Int. Cl.
| | |
|---|---|
| *B43K 8/22* | (2006.01) |
| *G06F 3/03* | (2006.01) |

(Continued)

(52) U.S. Cl.
CPC ............... *B43K 8/22* (2013.01); *B43K 7/12* (2013.01); *B43K 24/10* (2013.01); *B43K 27/003* (2013.01);
(Continued)

(58) Field of Classification Search
CPC ........... B43K 8/22; B43K 24/12; B43K 29/08
See application file for complete search history.

(56) References Cited

U.S. PATENT DOCUMENTS

| | | | | |
|---|---|---|---|---|
| 3,294,068 A | * | 12/1966 | Hechtle | B43K 24/12 401/112 |
| 4,532,376 A | | 7/1985 | Rockwell | |

(Continued)

FOREIGN PATENT DOCUMENTS

| | | |
|---|---|---|
| CN | 103376923 A | 10/2013 |
| CN | 203982305 U | 12/2014 |

(Continued)

OTHER PUBLICATIONS

Extended European Search Report, dated Jan. 17, 2018, for European Application No. 16743082.6—1216 / 3252571 PCT/JP20166050623, 8 pages.

(Continued)

*Primary Examiner* — David P Angwin
*Assistant Examiner* — Bradley S Oliver
(74) *Attorney, Agent, or Firm* — Seed IP Law Group LLP

(57) ABSTRACT

Various embodiments provide a position pointer that includes a plurality of refill bodies that can be configured at low cost, and ensures freedom from malfunction during exchange of signals with a sensor section of a position detection device. In one embodiment, the position pointer includes a tubular housing having an opening portion, a plurality of refill bodies, a refill body selection mechanism section that selectively causes at least a tip of one of the plurality of refill bodies to project from the opening portion, a magnetic material core, and a coil wound around the magnetic material core. The refill bodies not selected by the refill body selection mechanism section are located away from a through hole of the magnetic material core.

14 Claims, 6 Drawing Sheets

(51) Int. Cl.
  *G06F 3/046* (2006.01)
  *B43K 7/12* (2006.01)
  *B43K 24/10* (2006.01)
  *B43K 27/00* (2006.01)
  *G06F 3/0354* (2013.01)

(52) U.S. Cl.
  CPC ............ *G06F 3/03* (2013.01); *G06F 3/03545* (2013.01); *G06F 3/046* (2013.01)

(56) References Cited

U.S. PATENT DOCUMENTS

| | | | |
|---|---|---|---|
| 5,599,122 A * | 2/1997 | Yu | B43K 24/12 401/31 |
| 6,727,439 B2 * | 4/2004 | Chao | B43K 8/22 178/19.01 |
| 6,924,442 B2 * | 8/2005 | Nakano | G06F 3/03545 178/18.01 |
| 7,946,777 B2 * | 5/2011 | Yamauchi | B43K 27/12 401/31 |
| 8,525,816 B2 * | 9/2013 | Fukushima | G06F 3/03545 178/18.01 |
| 8,913,041 B2 | 12/2014 | Fukushima et al. | |
| 9,063,025 B2 | 6/2015 | Horie et al. | |
| 9,268,417 B2 | 2/2016 | Oda et al. | |
| 9,430,061 B2 * | 8/2016 | Eruchimovitch | G06F 3/03545 |
| 10,228,786 B2 * | 3/2019 | Jung | G06F 3/044 |
| 2002/0074171 A1 | 6/2002 | Nakano et al. | |
| 2004/0246211 A1 * | 12/2004 | Perkins | B43K 21/033 345/79 |
| 2008/0030486 A1 * | 2/2008 | Cook | G06F 3/03545 345/179 |
| 2011/0219892 A1 | 9/2011 | Fukushima et al. | |
| 2012/0256830 A1 | 10/2012 | Oda et al. | |
| 2013/0199311 A1 | 8/2013 | Horie et al. | |
| 2014/0069532 A1 * | 3/2014 | Obata | G06F 3/046 137/554 |
| 2014/0118311 A1 * | 5/2014 | Yeh | G06F 3/046 345/179 |
| 2015/0247743 A1 | 9/2015 | Horie et al. | |
| 2016/0132135 A1 | 5/2016 | Oda et al. | |
| 2016/0187217 A1 | 6/2016 | Horie et al. | |
| 2016/0188008 A1 | 6/2016 | Horie et al. | |
| 2017/0361639 A1 * | 12/2017 | Kaneda | B43K 5/02 |
| 2018/0011560 A1 * | 1/2018 | Kamiyama | G06F 3/0383 |

FOREIGN PATENT DOCUMENTS

| | | | |
|---|---|---|---|
| JP | 58-005148 U1 | | 1/1983 |
| JP | 05-019937 A | | 1/1993 |
| JP | 05019937 A | * | 1/1993 |
| JP | 11-95903 A | | 4/1999 |
| JP | 2011-186803 A | | 9/2011 |
| JP | 2012-221304 A | | 11/2012 |
| JP | 2012-234423 A | | 11/2012 |
| JP | 2013-161307 A | | 8/2013 |

OTHER PUBLICATIONS

International Search Report, dated Mar. 22, 2016, for corresponding International Application No. PCT/JP2016/050623, 4 pages.
European Office Action, dated May 16, 2019, for European Application No. 16 743 082.6-1205, 9 pages.
Chinese Office Action, dated Dec. 25, 2019, for Chinese Application No. 201680004386.0, 23 pages.

* cited by examiner

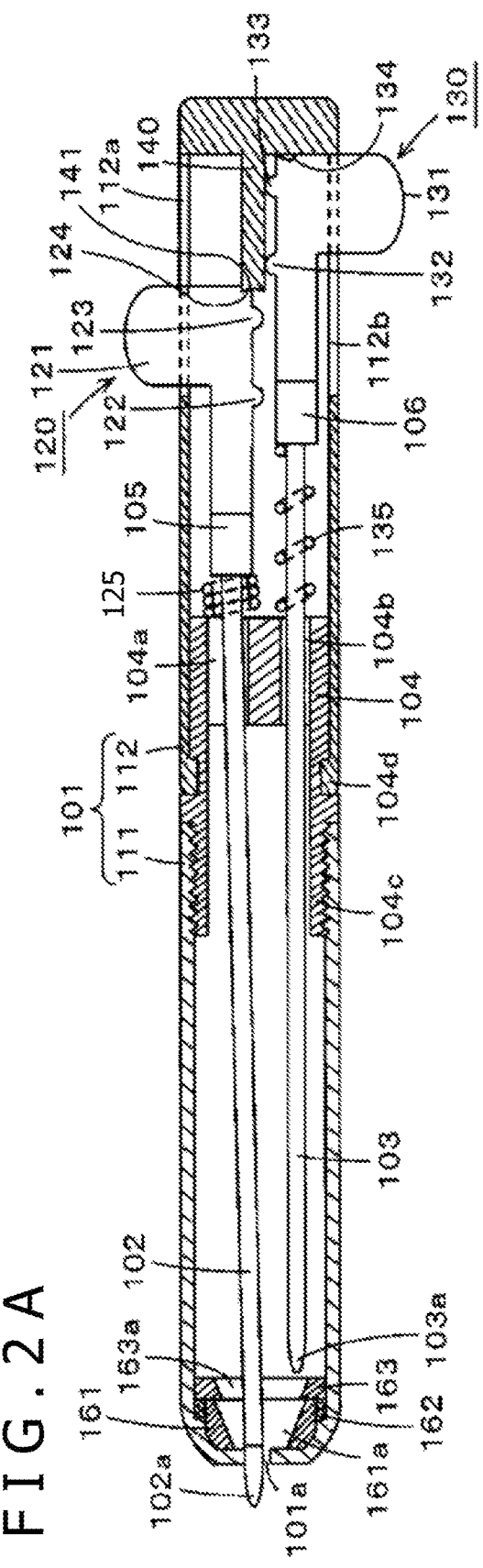
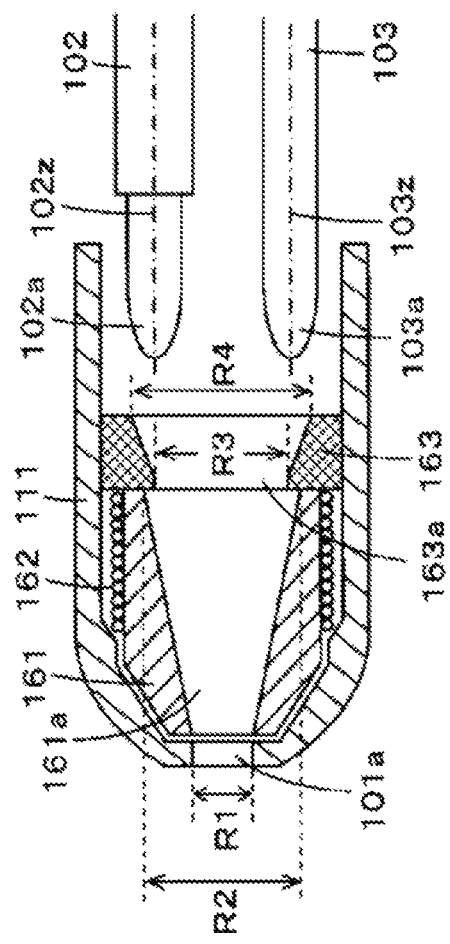
FIG. 2A
FIG. 2B

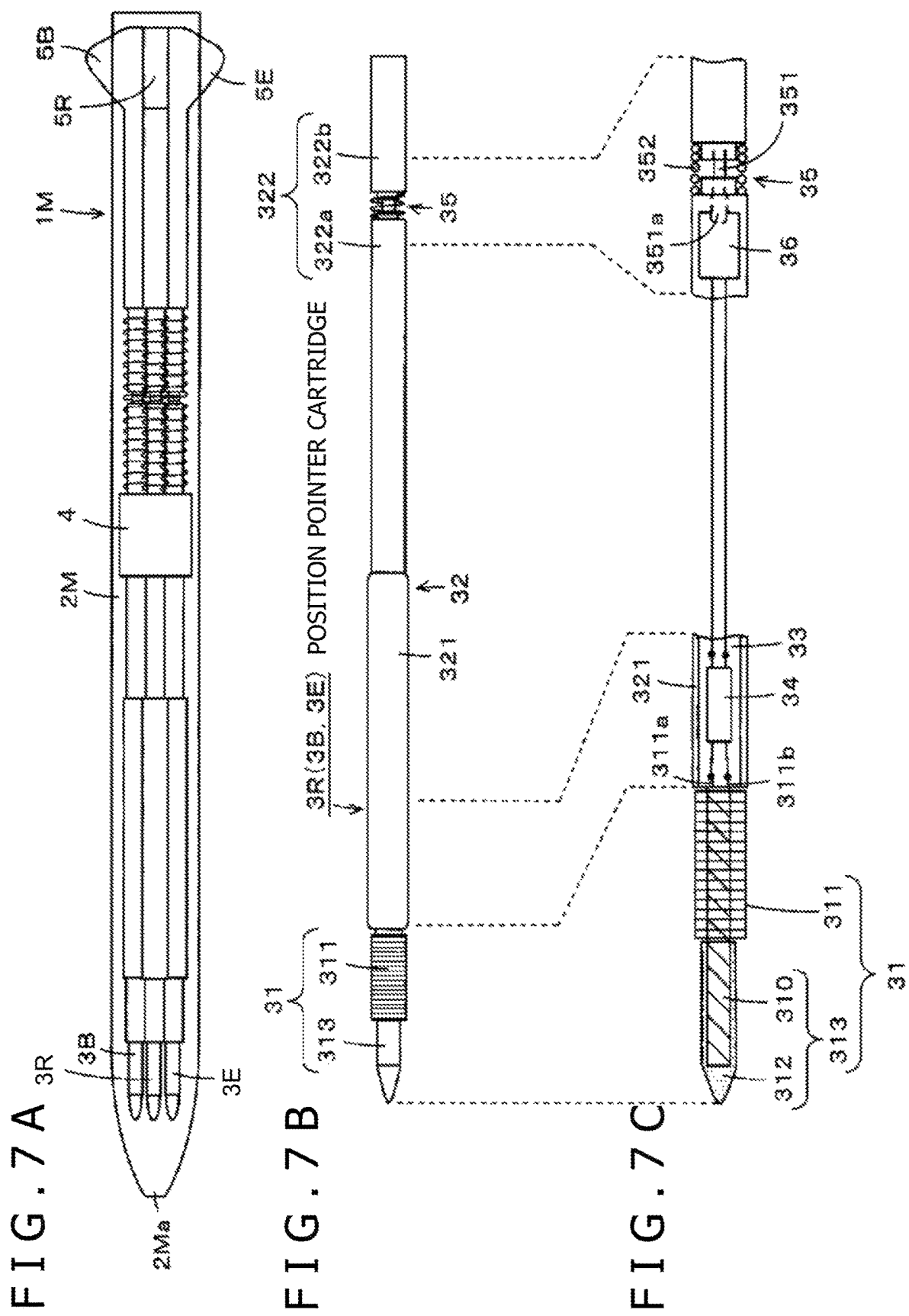

POSITION POINTER

BACKGROUND

Technical Field

One or more embodiments of the present invention relates to a position pointer used together with a position detection device.

Description of the Related Art

Among pens hitherto available as writing instruments, there are some, such as multi-color ballpoint pen, that accommodates a plurality of ballpoint pen refills filled with inks of different colors in a single common housing. Using this multi-color ballpoint pen makes it possible to write in a plurality of colors with a single pen without having a plurality of pens with inks of different colors, which is extremely convenient.

Incidentally, a position pointer called an electronic pen is known as a means of performing input pointing on a portable terminal, such as a pad-type personal computer (PC) or a cellphone terminal. A portable terminal for which this type of position pointer is used as input means includes, in general, a sensor for position detection that is laid over a display screen, and that can accept detailed pointing and operation inputs on the display screen by the position pointer. It is possible to perform elaborate input pointing that is difficult to input with a mouse or finger by using a position pointer, which is extremely useful.

There is a case in which one draws a painting using a position pointer. One draws a painting, for example, by making full use of a plurality of colors. Heretofore, however, a menu, such as tint menu for lines input by pointing with a position pointer, was presented on the side of an electronic device, such as portable terminal having a position detection device used together with the position pointer. From the menu, the user of the position pointer changed the color input with the position pointer by selecting a desired color. Alternatively, there was a case in which a plurality of electronic pens set to given colors was used.

Also, there is a case in which a form or a contract, for example, is placed on a sensor that detects a position pointed to by a position pointer, and in which one wishes to leave handwriting electronically, while at the same time directly signing the document. In such a case, this was realized by incorporating a ballpoint pen refill in a housing of the position pointer as described, for example, in Patent Document 1 (Japanese Patent Laid-Open No. 2012-234423).

PRIOR ART DOCUMENT

Patent Document

Patent Document 1: Japanese Patent Laid-Open No. 2012-234423

BRIEF SUMMARY

Technical Problems

As described above, the demand for an electronic pen (position pointer) capable of addressing diversified manners of use in recent years has intensified. For this reason, a position pointer is under study that includes a plurality of electronic pen functions to deal with a plurality of colors, functions, and so on. One approach for that purpose is to shape an electronic pen into a cartridge and incorporate the cartridge in a housing similar to that of a multi-color ballpoint pen in the same manner as for a ballpoint pen refill.

As an example of a position pointer adopting this approach, although not known, a position pointer 1M as illustrated in FIGS. 7A, 7B, and 7C are under study. In the position pointer 1M of this example, as illustrated in FIG. 7A, three position pointer cartridges 3R, 3B, and 3E are accommodated in a housing 2M. One of the three position pointer cartridges 3B, 3R, and 3E is selected by a knocking mechanism, and a tip of a pen tip portion of the selected position pointer cartridge is caused to project from an opening 2Ma on the pen tip side of the housing 2M for use.

Here, each of the position pointer cartridges 3B, 3R, and 3E is a type that couples to the position detection device by electromagnetic induction, and is substantially the same size as commercial knocking-type ballpoint pen refills such that the cartridge has a configuration that allows the cartridge to be interchangeable with commercial knocking-type ballpoint pen refills. For this reason, the housing 2M has the same configuration as commercial knocking-type multi-color ballpoint pen housings and knocking mechanisms. Therefore, a commercial knocking-type multi-color ballpoint pen housing and knocking mechanism can be used in an 'as-is' manner.

The position pointer cartridges 3B, 3R, and 3E of the position pointer 1M in the example of FIGS. 7A, 7B, and 7C all have the same configuration. However, functions of each cartridges including, for example, line color and line types, such as a solid line and a dashed line, are assigned by identification information sent from each of the position pointer cartridges 3B, 3R, and 3E.

For example, the position pointer cartridge 3B is assigned a function to indicate, in black, a path (character or graphics) shown to match with a position pointed to by the position pointer cartridge 3B. The position pointer cartridge 3R, for example, is assigned a function to indicate, in red, a path shown to match with a position pointed to by the position pointer cartridge 3R. The position pointer cartridge 3E, for example, is assigned a function to delete a path that was input by pointing to match with a position pointed to by the position pointer cartridge 3E.

The position detection device used together with the position pointer cartridges 3B, 3R, and 3E realizes the functions assigned to each of the position pointer cartridges 3B, 3R, and 3E by receiving identification information sent from each of the position pointer cartridges 3B, 3R, and 3E, and distinguishing differences between the position pointer cartridges 3B, 3R, and 3E.

FIG. 7B is a diagram illustrating a configuration example of the position pointer cartridges 3B, 3R, and 3E. FIG. 7C is a diagram for describing a configuration of main parts of the position pointer cartridges 3B, 3R, and 3E illustrated in FIG. 7B.

The position pointer cartridges 3B, 3R, and 3E have an integral configuration in which a refill body portion 31 and a tubular body portion 32 are joined together as illustrated in FIG. 7B. The refill body portion 31 has a configuration in which a pen tip portion 313 is formed in such a manner that a coil 311 is partially wound around a magnetic material core, which in this case is a ferrite core 310, and in which the portion with no coil 311 wound therearound is covered with a protective material 312 as illustrated in FIG. 7C.

The tubular body portion 32 includes a first tubular body portion 321 in which electronic circuit components are disposed, and a second tubular body portion 322 in which writing pressure detection components are disposed. As illustrated in FIG. 7C, a printed circuit board 33 is disposed inside the first tubular body portion 321 of the tubular body portion 32, and a circuit component 34 is provided on the printed circuit board 33. The circuit component 34 includes a capacitor that makes up a resonance circuit together with the coil 311.

The refill body portion 31 and the first tubular body portion 321 of the tubular body portion 32 are integrally configured by being joined together, for example, with part of the ferrite core 310 of the refill body portion 31 inserted in the first tubular body portion 321.

The second tubular body portion 322 includes, in this example, a tubular body having substantially the same diameter as an ink compartment section of a commercial ballpoint pen refill. As illustrated in FIG. 7B, the second tubular body portion 322 is divided into a long portion 322a and a short portion 322b, and a writing pressure detection member 36 is provided near a joint section 35 thereof.

As illustrated in FIG. 7C, the long portion 322a and the short portion 322b are joined at the joint section 35 via a connection rod member 351 and a coil spring 352. In this case, the long portion 322a and the short portion 322b are configured such that, although constantly elastically displaced in such a manner as to be axially apart from each other by the coil spring 352, the long portion 322a and the short portion 322b are locked by the connection rod member 351 at given positions and cannot be axially displaced further.

As illustrated in FIG. 7C, the writing pressure detection member 36 is provided in the long portion 322a. A side of one end 351a of the connection rod member 351 is configured to function as a pressing section of the writing pressure detection member 36.

The writing pressure detection member 36 is configured, for example, as a variable capacitor that uses writing pressure detection means having a known configuration and whose capacitance varies in accordance with the writing pressure described in Japanese Patent Laid-Open No. 2011-186803, Patent Document.

When a pressure is applied to the tips of the position pointer cartridges 3B, 3R, and 3E, a force is exerted that causes the sides of the long portions 322a of the position pointer cartridges 3B, 3R, and 3E, as a whole, to attempt to move toward the sides of the short portions 322b against elastic forces of the coil springs 352. As a result, the capacitance of the writing pressure detection member 36 changes to match with the writing pressure. Therefore, it is possible to detect the pressures (writing pressures) applied to the tips of the position pointer cartridges 3B, 3R, and 3E by detecting the capacitance of the writing pressure detection member 36.

Each of the position pointer cartridges 3B, 3R, and 3E having a configuration as described above fits into a knocking rod 5B, 5R, or 5E that makes up part of the knocking mechanism of the position pointer 1M and introduced into the housing 2M through a holder section 4. As one of the knocking rods 5B, 5R, and 5E slides toward the pen tip side, the pen tip (tip) of one of the position pointer cartridges 3B, 3R, and 3E is caused to project. Then, the resonance circuit made up of the coil 311 wound around the ferrite core 310 of the position pointer cartridge whose tip has projected and a capacitor (not shown) electromagnetically couples with the sensor of the position detection device. As the position pointer cartridge whose tip has projected exchanges signals with the position detection device, it becomes possible to point to positions.

The position pointer 1M configured as described above has an advantage in that a housing of a commercial multicolor ballpoint pen, a writing instrument, can be used in an 'as-is' manner. Unfortunately, the position pointer 1M has the following problems.

The position pointer 1M uses position pointer cartridges that can be replaced with commercial ballpoint pen refills. Further, each of the position pointer cartridges of this position pointer includes a ferrite core with a coil wound therearound so that signals are exchanged with the sensor side of the position detection device through electromagnetic induction (resonance operation).

Because the position pointer 1M is configured to accommodate a plurality of position pointer cartridges in a single housing, the ferrite cores and the coils of the plurality of position pointer cartridges are adjacent to each other in the housing. Consequently, when signals are exchanged between the position pointer cartridges and the sensor of the position detection device, there is a case in which the resonance circuits of the position pointer cartridges adjacent to each other interfere with each other.

Also, each of the position pointer cartridges not only needs to include a coil wound around a ferrite core but also requires a given circuit. As a result, each of the position pointer cartridges is expensive, and users wishing to use a plurality of kinds of position pointer cartridges (e.g., cartridges for black, for red, for an eraser, and so on) have a problem of mounting cost.

One or more embodiments of the present invention provide a position pointer capable of solving the above problems.

Technical Solution

In order to solve the above problems, one or more embodiments of the present invention provide a position pointer that includes a tubular housing having an opening portion on one end side, a plurality of refill bodies accommodated in the housing, a refill body selector or selection mechanism section that selectively causes at least a tip of one of the plurality of refill bodies to project from the opening portion, a magnetic material core disposed on the one end side of the housing having the opening portion, and a coil wound around the magnetic material core.

The magnetic material core has a through hole that one of the plurality of refill bodies can be inserted through and that communicates with the opening portion.

The refill bodies not selected by the refill body selection mechanism section are located away from the through hole of the magnetic material core. At least the tip of the refill body selected by the refill body selection mechanism section is caused to project externally from the opening portion via the through hole.

In the position pointer configured as described above according to one embodiment of the present invention, a magnetic material core is disposed on one end side of a tubular housing having an opening portion on the one end side, and a coil is wound on the one end side of the magnetic material core having the opening portion. A plurality of refill bodies are accommodated in the housing. The refill bodies not selected by a refill body selection mechanism section are located away from the through hole of the magnetic material core, and at least the tip of the refill body selected by the refill body selection mechanism section is caused to project externally from the opening portion via the through hole.

That is, in the position pointer according to one embodiment of the present invention, a common ferrite core for a plurality of refill bodies is disposed on one end side of a housing where an opening portion is formed, and a coil is wound around the ferrite core to permit exchange of signals with a sensor of a position detection device. According to one embodiment of the present invention, therefore, it is possible to attach commercial ballpoint pen refills or electronic pen refill bodies to the housing without using the position pointer cartridges as described above for use.

Because a common ferrite core around which a coil is wound is used for a plurality of refill bodies, no interference occurs as in the case of the plurality of position pointer cartridges described above. Moreover, commercial ballpoint pen refills or electronic pen refill bodies can be used. As a result, it is possible to keep cost low.

Advantageous Effects

According to one or more embodiments of the present invention, no components having a special configuration, such as position pointer cartridges, are required. As a result, it is possible to bring about the effects of configuring at low cost and ensuring freedom from malfunction, such as interference during exchange of signals with a sensor section of a position detection device.

BRIEF DESCRIPTION OF THE SEVERAL VIEWS OF THE DRAWINGS

FIGS. 2A and 2B depict diagrams for describing a configuration example of main parts of the embodiment of the position pointer according to one aspect of the present invention.

FIGS. 7A, 7B, and 7C depict diagrams for describing a configuration example of a position pointer that is not known and that has been proposed earlier.

DETAILED DESCRIPTION

Figure 1:
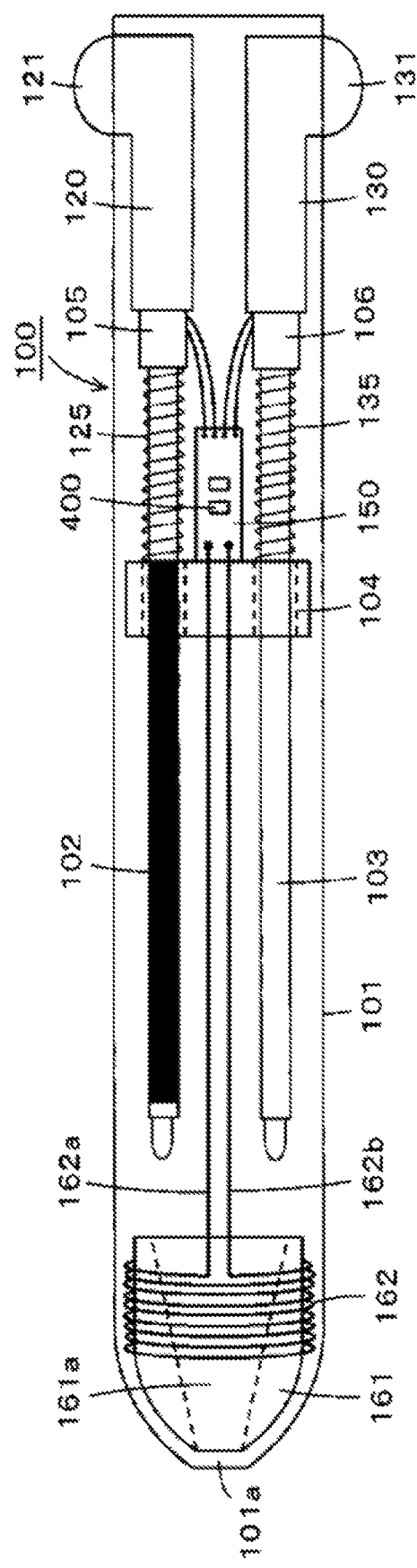
FIG. 1 is a diagram illustrating a configuration example of an outline of an embodiment of a position pointer according to one aspect of the present invention.

Embodiments of a position pointer according to one or more embodiments of the present invention will be described below with reference to drawings. FIG. 1 is a schematic configuration diagram for describing an overall configuration of a position pointer 100 according to an embodiment of the present invention. Also, FIG. 2A is a vertical sectional view of the position pointer 100 of the embodiment. Further, FIG. 2B is a diagram illustrating a configuration of a housing 101 of the position pointer 100 of the embodiment on an opening portion side where a tip of a refill body projects.

As illustrated in FIG. 1 and FIG. 2A, the position pointer 100 in the present embodiment is configured such that two refill bodies including a first refill body 102 and a second refill body 103 are accommodated in the housing 101, such that, of the two refill bodies 102 and 103, a tip (a tip 102a of the refill body 102 in the example of FIG. 2A of the refill body selected by a refill body selector or selection mechanism (refill body 102 in the example of FIG. 2A projects from an opening portion 101a formed on one axial end side of the housing 101. In this example, the opening portion 101a is formed in a first housing portion 111.

The housing 101 includes a tubular body having the opening portion 101a on the one end side. In this example, as illustrated in FIGS. 2A and 2B, the housing 101 is integrally joined as the first housing portion 111 and a second housing portion 112. The two parts axially divided from the housing 101, are joined together at a portion of a refill body holder 104. The opening portion 101a of the housing 101 is formed on the side opposite to the side joined to the refill body holder 104 of the first housing portion 111.

The refill body holder 104 includes a through hole 104a and a through hole 104b through, which the two refill bodies 102 and 103 are inserted. Then, as illustrated in FIG. 2A, the first housing portion 111 is screwed and joined to the refill body holder 104 at a thread section 104c of the refill body holder 104. The second housing portion 112 is fitted and joined at a fitting section 104d of the refill body holder 104.

A first knocking operation section 120 for the first refill body 102 and a second knocking operation section 130 for the second refill body 103 are provided on the second housing portion 112, and a stopper 140 is provided. The first knocking operation section 120 includes a projecting portion 121, a protruding portion 122, a protruding portion 123, and a cutout groove 124. The projecting portion 121 projects externally from a slit 112a formed in the second housing portion 112. The protruding portion 122 and the protruding portion 123 project in the direction of a central axis of the second housing portion 112. The cutout groove 124 engages with the stopper 140. Similarly, the second knocking operation section 130 includes a projecting portion 131, a protruding portion 132, a protruding portion 133, and a cutout groove 134. The projecting portion 131 projects externally from a slit 112b formed in the second housing portion 112. The protruding portion 132 and the protruding portion 133 project in the direction of the central axis of the second housing portion 112. The cutout groove 134 engages with the stopper 140. At the tip of the stopper 140, a recess portion 141 is formed that engages with the cutout groove 124 of the first knocking operation section 120 or the cutout groove 134 of the second knocking operation section 130.

Also, a writing pressure detection member 105 and a writing pressure detection member 106 are provided at axial end portions of the first knocking operation section 120 and the second knocking operation section 130, respectively, on the side of the opening portion 101a. The writing pressure detection member 105 and the writing pressure detection member 106 include variable capacitors whose capacitances vary in accordance with the writing pressures. The variable capacitors use, for example, writing pressure detection means having a known configuration described in Japanese Patent Laid-Open No. 2011-186803, Patent Document described earlier.

The first refill body 102 can be joined and attached to the first knocking operation section 120 by press-fitting the end portion of the first refill body 102 on the side opposite to the tip 102a into a fitting section (not shown) of the writing pressure detection member 105 that is provided by being joined to the first knocking operation section 120 after having inserted the end portion of the first refill body 102 through the through hole 104a of the refill body holder 104. This allows the first refill body 102 to be introduced into the housing 101.

Similarly, the second refill body 103 is joined and attached to the second knocking operation section 130 by press-fitting the end portion of the second refill body 103 on the side opposite to a tip 103a into a fitting section (not shown) of the writing pressure detection member 106 that is provided by being joined to the second knocking operation section 130 after having inserted the end portion of the second refill body 103 through the through hole 104b of the refill body holder 104. This allows the second refill body 103 to be introduced into the housing 101. In this state, the variable capacitors made up of the writing pressure detection member 105 and the writing pressure detection member 106 can present capacitances that match with pressures applied to the tip 102a and the tip 103a of the first refill body 102 and the second refill body 103.

It should be noted that the first refill body 102 and the second refill body 103 can be attached by being fitted into the writing pressure detection member 105 and the writing pressure detection member 106, respectively. Therefore, the first refill body 102 and the refill body 103 are replaceable.

As illustrated in FIG. 1, one end and other end of the variable capacitor that includes the writing pressure detection member 105 and one end and other end of the variable capacitor that includes the writing pressure detection member 106 are electrically connected individually to a conductor pattern of a printed circuit board 150 disposed in the second housing portion 112. For example, a control circuit 400 made up of an integrated circuit (IC) and so on are provided on the printed circuit board 150. The control circuit 400 calculates writing pressure values detected individually by the writing pressure detection member 105 and the writing pressure detection member 106 based on the capacitances of the variable capacitors of the writing pressure detection member 105 and the writing pressure detection member 106, respectively, as will be described later.

As illustrated in FIG. 1 and FIG. 2A, a spring 125 inserted through the first refill body 102 is provided between the refill body holder 104 and the writing pressure detection member 105. Similarly, as illustrated in FIG. 1 and FIG. 2A, a spring 135 inserted through the second refill body 103 is provided between the refill body holder 104 and the writing pressure detection member 106. These springs 125 and 135 are elastic members for restoring the knocking operation section 120 and the knocking operation section 130, respectively, to their original positions.

In this example, the refill body selection mechanism includes the knocking operation section 120, the knocking operation section 130, the stopper 140, the spring 125, and the spring 135. The user can slide, toward the direction of the opening portion 101a (hereinafter referred to as a pen tip direction), either of the projecting portion 121 of the knocking operation section 120 and the projecting portion 131 of the knocking operation section 130 that project from the slit 112a and the slit 112b, respectively, formed in the second housing portion 112. The projecting portion 121 and the protecting portion 131 slide in a manner guided by the slit 112a against the elastic force of the spring 125 and by the slit 112b against the elastic force of the spring 135, respectively.

When the knocking operation section 120 or the knocking operation section 130 is slid to a given position, the cutout groove 124 or the cutout groove 134 of the knocking operation section 120 or the knocking operation section 130, respectively, engages with the recess portion 141 of the stopper 140 and becomes locked at that position. FIG. 2A illustrates a state in which the knocking operation section 120 is slid and the tip 102a of the first refill body 102 projects externally from the housing 101 from the opening portion 101a. Thus, as a result of external projection of the tip 102a, the first refill body 102 can receive a writing pressure.

When the tip 102a of the first refill body 102 projects externally as illustrated in FIG. 2A, it is possible to bring the tip 102a of the first refill body 102 back to the state where the tip 102a is accommodated within the housing 101 and, at the same time, switch the tip 103a of the second refill body 103 to the state where the tip 103a projects externally from the housing 101 by sliding the second knocking operation section 130 toward the pen tip direction.

In this case, when an operation of sliding the projecting portion 131 of the second knocking operation section 130 (knocking operation) is performed, the protruding portion 132 and the protruding portion 133 of the knocking operation section 130 act to push out the first knocking operation section 120 toward the direction of the slit 112a. This causes the cutout groove 124 of the first knocking operation section 120 to be detached from the recess portion 141 of the stopper 140. Then, the first knocking operation section 120 moves along the stopper 140 that is biased in the direction opposite to the pen tip direction because of the restoring force of the spring 125. As a result, the tip 102a is introduced into the housing 101.

Then, the cutout groove 134 of the second knocking operation section 130 engages with the recess portion 141 of the stopper 140 and becomes locked at that position. Similarly, when the first knocking operation section 120 is slid toward the pen tip direction from this state, the protruding portion 122 and the protruding portion 123 of the first knocking operation section 120 act to push out the second knocking operation section 130 toward the direction of the slit 112b. This causes the cutout groove 134 of the second knocking operation section 130 to be detached from the recess portion 141 of the stopper 140. The second knocking operation section 130 moves along the stopper 140 that is biased in the direction opposite to the pen tip direction because of the restoring force of the spring 135. As a result, the tip 103a of the second refill body 103 is introduced into the housing 101, and the tip 102a of the first refill body 102 projects externally from the housing 101.

As described above, the position pointer 100 of the present embodiment changes, as a result of knocking operation, to a state where the tip 102a of the first refill body 102 projects externally from the opening portion 101a (first state), to a state where the tip 103a of the second refill body 103 projects externally from the opening portion 101a (second state), or to a state where both the first refill body 102 and the second refill body 103 are accommodated in the housing 101 (third state).

In the position pointer 100 of the present embodiment, a ferrite core 161, as an example of a magnetic material core, is disposed on the side of the opening portion 101a of the first housing portion 111. A coil 162 is wound around the ferrite core 161. Then, one end 162a and other end 162b of the coil 162 are electrically connected individually to the conductor pattern of the printed circuit board 150 as illustrated in FIG. 1.

As will be described later, a capacitor (capacitor 401 in FIG. 3) connected in parallel to the coil 162 to make up a resonance circuit is provided on the printed circuit board 150. This resonance circuit is used to enable exchange of signals between the position pointer 100 and the sensor of the position detection device so that a position pointed to by the position pointer 100 can be detected by the position detection device.

A through hole 161a through which the first refill body 102 or the second refill body 103 is inserted is formed in the ferrite core 161 as illustrated in FIG. 1, FIG. 2A, and FIG. 2B. The ferrite core 161 is arranged at the end portion of the first housing portion 111 on the side of the opening portion 101a such that a central axial line position of the through hole 161a coincides with a central axial line position of the housing 101, and such that the through hole 161a communicates with the opening portion 101a of the housing 101.

As illustrated in FIG. 2B, a diameter of the through hole 161a on the side of the opening portion 101a is substantially the same as a diameter R1 of the opening portion 101a. Also, a diameter R2 of the through hole 161a on the side opposite to the side of the opening portion 101a is selected to be larger than the diameter R1 on the side of the opening portion 101a (R1<R2). In this case, as illustrated in FIG. 2B, it is preferred that the diameter R2 of the through hole 161a on the side opposite to the side of the opening portion 101a should have such a size that lines extending from a centerline 102z of the tip 102a of the first refill body 102 and a centerline 103z of the tip 103a of the second refill body 103 are within the diameter R2 in the state where both the tip 102a of the first refill body 102 and the tip 103a of the second refill body 103 are accommodated in the housing 101 (third state described above).

An inner wall surface of the through hole 161a of the ferrite core 161 is formed in a tapered shape such that the diameter gradually decreases from the diameter R2 to the diameter R1. Here, the tapered surface of the inner wall surface of the through hole 161a need not change linearly as long as the change from the diameter R2 to the diameter R1 takes place gradually.

The ferrite core 161 is fastened by a fastening member 163 in a manner pressed against the side of the opening portion 101a of the first housing portion 111 as illustrated in FIG. 2A and FIG. 2B. The fastening member 163 is a ring-shaped member having a through hole 163a, and a diameter of an outer perimeter side surface thereof is approximately equal to or slightly smaller than an inner diameter of the first housing portion 111. As the fastening member 163 is fastened inside the first housing portion 111, for example, as a result of bonding of the outer perimeter side surface of the fastening member 163 to the inner wall surface of the first housing portion 111, the ferrite core 161 is also fastened inside the first housing portion 111.

The fastening member 163 is configured such that the central axial line position of the through hole 163a coincides with the central axial line position of the through hole 161a of the ferrite core 161, and such that the through hole 163a communicates with the through hole 161a of the ferrite core 161. As illustrated in FIG. 2B, a diameter R3 of the through hole 163a of the ferrite core 163 on the side of the opening portion 101a is a value substantially equal to or smaller than the diameter R2 of the through hole 161a of the ferrite core 161 on the side opposite to the side of the opening portion 101a (R3≤R2).

Also, a diameter R4 of the through hole 163a of the fastening member 163 on the side opposite to the side of the opening portion 101a is selected to be a larger value than the diameter R2 of the through hole 161a of the ferrite core 161 on the side opposite to the side of the opening portion 101a (R4>R2).

The inner wall surface of the through hole 163a of the fastening member 163 is formed in a tapered shape such that the diameter gradually decreases from the diameter R4 to the diameter R3. Here, the tapered surface of the inner wall surface of the through hole 163a need not change linearly as long as the change from the diameter R4 to the diameter R3 takes place gradually.

As a result of the selection of the diameters R3 and R4 of the through hole 163a of the fastening member 163 as described above, lines extending from the centerline 102z of the tip 102a of the first refill body 102 and the centerline 103z of the tip 103a of the second refill body 103 are within the diameter R4 of the fastening member 163 in the state where both the tip 102a of the first refill body 102 and the tip 103a of the second refill body 103 are accommodated in the housing 101 (third state described above) as illustrated in FIG. 2B.

As illustrated in FIG. 2B, the tip 102a of the first refill body 102 and the tip 103a of the second refill body 103 are configured to be located at positions further away from the through hole 163a of the fastening member 163 in the state where both the tip 102a of the first refill body 102 and the tip 103a of the second refill body 103 are accommodated in the housing 101 (third state described above).

As described earlier, when the knocking operation section 120 or the knocking operation section 130 is operated and slid toward the pen tip direction, the first refill body 102 or the second refill body 103 matching therewith is first introduced into the through hole 161a of the ferrite core 161 while at the same time being guided onto the tapered portion surface of the through hole 163a of the fastening member 163. Then, the tip 102a of the first refill body 102 or the tip 103a of the second refill body 103 passes through the through hole 161a of the ferrite core 161 in response to the sliding movement operation of the knocking operation section 120 or the knocking operation section 130, and projects externally from the opening 101a as illustrated in FIG. 2A.

It should be noted that the first refill body 102 and the second refill body 103 in the present embodiment are capable of warping in directions intersecting the axial directions thereof.

In this example, the first refill body 102 is configured as a commercial ballpoint pen refill that includes the tip 102a made of, for example, a metal and a tubular member made of resin that is filled with a black ink to supply the black ink concerned to the tip 102a concerned. As is known, this ballpoint pen refill is capable of warping in directions intersecting the axial direction thereof.

Also, the second refill body 103 is an electronic pen refill configured as an electromagnetic inductive electronic pen refill body. This electronic pen refill is made of a relatively hard and elastic resin material, such as polyoxymethylene (POM), and is capable of warping in directions intersecting the axial direction thereof. The second refill body 103 is made of a resin material that has the same or approximately the same magnetic permeability as the ballpoint pen refill in the example of the first refill body 102 thanks, for example, to magnetic material powder contained.

As described above, in the position pointer 100 of the present embodiment, the common single ferrite core 161 for the first refill body 102 and the second refill body 103 is provided on the one end side of the housing 101 (i.e., the pen tip). Because the through hole 161a of the ferrite core 161 concerned is in a tapered shape, the first refill body 102 or the second refill body 103 is readily inserted through the through hole 161a of the ferrite core 161.

Also, in the present embodiment, the through hole 163a having a tapered inner wall surface is formed in the fastening member 163 that fastens the ferrite core 161 inside the housing 101. Therefore, the first refill body 102 or the second refill body 103 is readily guided into the through hole 161a of the ferrite core 161.

In the present embodiment, thanks to the resonance circuit made up of the coil 162 wound around the ferrite core 161 and the capacitor provided on the printed circuit board 150, signals are exchanged with the sensor of the position detection device. The resonance circuit is configured to start operation when the tip 102a of the first refill body 102 or the tip 103a of the second refill body 103 projects externally from the opening portion 101a, and when a given writing pressure or more is applied to the projecting tip 102a or tip 103a.

Further, in the position pointer 100 of the present embodiment, which of the writing pressure detection member 105 and the writing pressure detection member 106 has detected a given writing pressure or more is determined, to be able to determine which of the tip 102a of the first refill body 102 and the tip 103a of the second refill body 103 projects externally from the opening portion 101a. The electronic circuit that realizes the above is formed on the printed circuit board 150.

[Circuit Configuration Example of Position Pointer 100 and Circuit Configuration Example of Position Detection Device]

Figure 3:
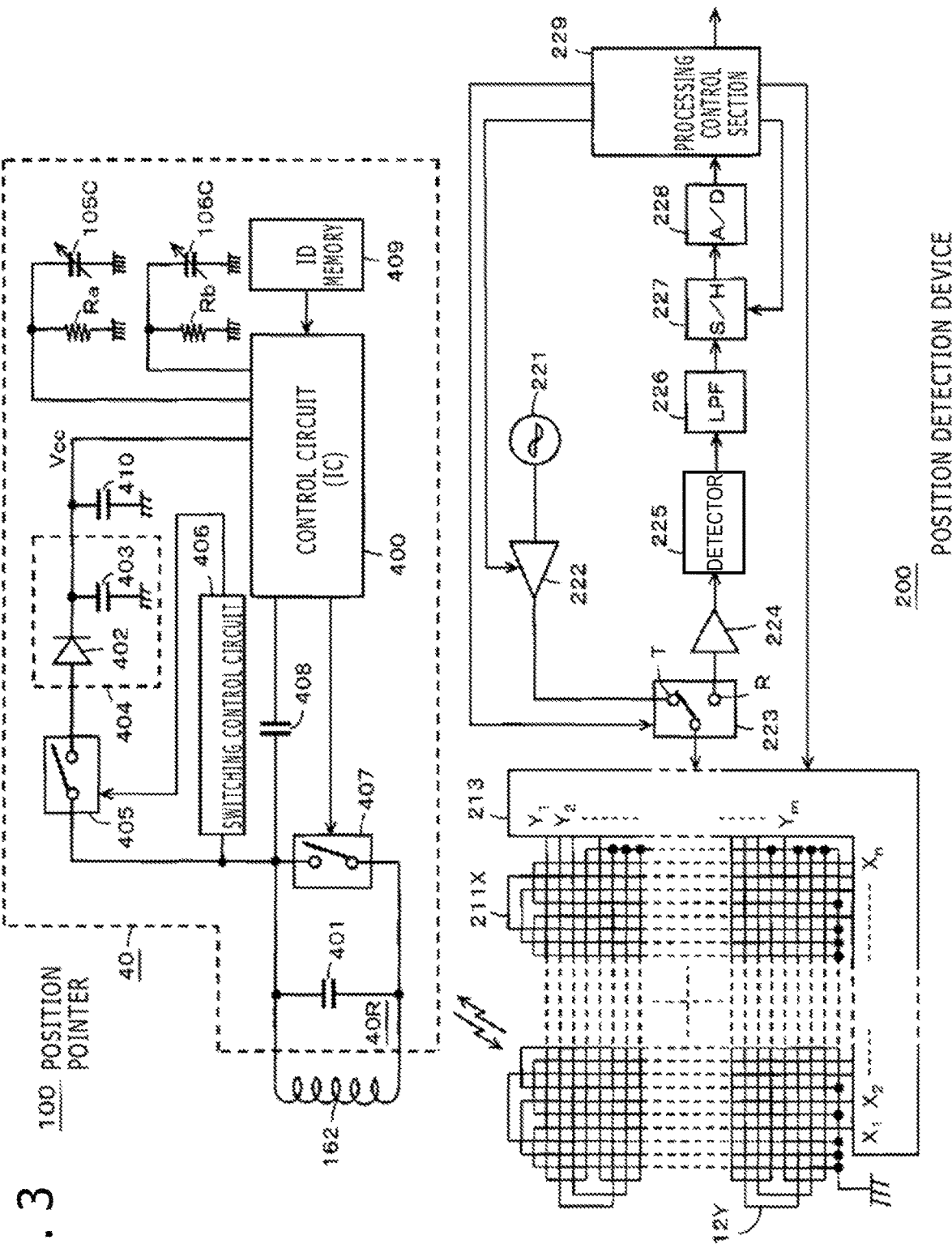
FIG. 3 is a block diagram illustrating a configuration example of an electronic circuit of the embodiment of the position pointer according to one aspect of the present invention together with a circuit configuration example of a corresponding position detection device.

FIG. 3 is a diagram illustrating a configuration example of an electronic circuit 40 formed on the printed circuit board 150 of the position pointer 100 of the present embodiment, together with a circuit configuration example of a position detection device 200 that exchanges signals with the position pointer 100 by electromagnetic inductive coupling.

In the present embodiment, the position pointer 100 is configured to electromagnetically inductively couple with sensor conductors of the position detection device 200 and send, together with exchanging the position detection signals, to the position detection device 200, writing pressure information detected through the writing pressure detection member 105 and the writing pressure detection member 106, identification information (ID) of the position pointer 100 itself, and identification information (ID) as to the tip of which of the first refill body 102 and the second refill body 103 projects externally from the opening portion 101a.

That is, in the electronic circuit 40 of the position pointer 100, a parallel resonance circuit 40R is configured by a capacitor 401 in parallel with the coil 162 wound around the ferrite core 161.

Then, the electronic circuit 40 includes the control circuit 400 that controls transmission of additional information as illustrated in FIG. 3. In this example, the control circuit 400 is configured as an IC. The IC making up the control circuit 400 is configured to operate on a supply voltage Vcc obtained from an electric double layer capacitor 410 as an example of power storage means. An alternate current (AC) signal received by the parallel resonance circuit 40R from the position detection device 200 by electromagnetic coupling is rectified by a rectifying circuit 404 made up of a diode 402 and a capacitor 403 and stored in the electric double layer capacitor 410. It should be noted that although, in the example of FIG. 3, the rectifying circuit 404 is a half-wave rectifying circuit, the rectifying circuit 404 may also be a full-wave rectifying circuit. Also, the power supply of the control circuit 400 made up of an IC may be naturally a battery rather than power storage means, such as the electric double layer capacitor 410 in this example.

In this example, a normally open switching circuit 405 is provided between the parallel resonance circuit 40R and the rectifying circuit 404. The switching circuit 405 includes, for example, a semiconductor switching circuit. The switching circuit 405 is in high impedance state when the semiconductor switching circuit is open.

The switching circuit 405 is controlled to be on by a switching control signal from a switching control circuit 406. The switching control circuit 406 generates a switching control signal from the AC signal received by the parallel resonance circuit 40R from the position detection device 200 by electromagnetic coupling.

Also, in the electronic circuit 40, a switching circuit 407 is connected in parallel with the parallel resonance circuit 40R that includes the coil 162 and the capacitor 401. The switching circuit 407 is configured to be controlled to be ON or OFF by the control circuit 400. It should be noted that the control circuit 400 is supplied with an electromagnetically induced signal sent from the position detection device 200 via a capacitor 408 as a synchronizing signal for exchanging electromagnetically induced signals with the position detection device 200.

In the present embodiment, as illustrated in FIG. 3, a variable capacitor 105C and a variable capacitor 106C that include the writing pressure detection member 105 and the writing pressure detection member 106 are connected to the control circuit 400. A resistor Ra and a resistor Rb are connected in parallel with these variable capacitors 105C and 106C, respectively. In this example, the control circuit 400 measures the respective capacitances of the variable capacitor 105C and the variable capacitor 106C by measuring the time it takes until after charging the variable capacitor 105C and the variable capacitor 106C, the variable capacitor 105C and the variable capacitor 106C are discharged through the resistor Ra and the resistor Rb, and voltages of terminals to which the variable capacitor 105C and the variable capacitor 106C are connected (equivalent to voltages across the variable capacitor 105C and the variable capacitor 106C) reach a given threshold.

Then, the control circuit 400 detects a change in writing pressure from measured changes in the capacitances of the variable capacitor 105C and the variable capacitor 106C, and detects whether a writing pressure was applied to the first refill body 102 or the second refill body 103. When the control circuit 400 detects the application of a writing pressure, the control circuit 400 calculates the writing pressure value from the capacitance values of the variable capacitors 105C and 106C.

Then, in the present embodiment, the control circuit 400 sends calculated writing pressure value information (writing pressure data) to the position detection device 200 as a multi-bit digital signal by controlling the switching circuit 407 to be ON or OFF. In the present embodiment, writing pressure data makes up part of additional information.

Also, an ID memory 409 is connected to the control circuit 400. In this example, the ID memory 409 stores identification information (ID) that includes a manufacturer's number and a product number of the position pointer 100, identification information for identifying the first refill body 102 (ballpoint pen refill in this example) that matches with the writing pressure detection member 105, and identification information for identifying the second refill body 103 (electronic pen refill in this example) that matches with the writing pressure detection member 106. Then, the control circuit 400 sends the identification information stored in the ID memory 409, as a multi-bit digital signal, to the position detection device 200 by reading the identification information and controlling the switching circuit 407 to be ON or OFF. In the present embodiment, this identification information makes up part of additional information.

In the present embodiment, the control circuit 400 determines whether the tip 102a of the first refill body 102 projects externally from the opening portion 101a (first state), whether the tip 103a of the second refill body 103 projects externally from the opening portion 101a (second state), or whether the tips of both the refill bodies 102 and 103 are accommodated together in the housing 101 (third state). This determination is made based on the writing pressure values detected by the writing pressure detection member 105 and the writing pressure detection member 106.

That is, in the third state of the position pointer 100, the tips of both the refill bodies 102 and 103 are accommodated together in the housing 101. Therefore, no writing pressure is applied to the refill body 102 and the refill body 103. In the first state, the tip 102a of the first refill body 102 projects externally. Therefore, a state arises where the writing pressure applied to the tip 102a concerned is detected by the writing pressure detection member 105. On the other hand, in the second state, the tip 103a of the second refill body 103 projects externally. Therefore, a state arises where the writing pressure applied to the tip 103a concerned is detected by the writing pressure detection member 106.

In this example, when the writing pressure increases beyond a given threshold from the state where no writing pressure is applied, the control circuit 400 detects the increase and determines that the application of the writing pressure has started.

In the present embodiment, when the control circuit 400 detects that the application of the writing pressure on the first refill body 102 or the second refill body 103 has yet to be started, the control circuit 400 turns ON the switching circuit 407 to deactivate the parallel resonance circuit 40R. On the other hand, when the control circuit 400 detects that the application of the writing pressure on the first refill body 102 or the second refill body 103 has started, the control circuit 400 turns OFF the switching circuit 407 to activate the parallel resonance circuit 40R.

Therefore, when the given writing pressure is applied to the tip of the refill body in the state where the tip 102a of the first refill body 102 projects externally from the opening portion 101a (first state) or in the state where the tip 103a of the second refill body 103 projects externally from the opening portion 101a (second state), exchange of signals with the position detection device 200 is started by the activated parallel resonance circuit 40R.

When, in this state, the control circuit 400 receives a synchronizing signal from the position detection device through the capacitor 408, the control circuit 400 sends writing pressure data and identification information to the position detection device 200 as an amplitude shift keying (ASK)-modulated signal, as will be described later, by controlling the switching circuit 407 to be ON or OFF at the timing based on that synchronizing signal. It should be noted that writing pressure data and identification information may be modulated into on off keying (OOK) signal rather than using ASK modulation.

As illustrated in FIG. 3, a position detection coil is formed in the position detection device 200 by stacking an X-axis direction loop coil group 211X and a Y-axis direction loop coil group 212Y. The loop coil group 211X and the loop coil group 212Y include, for example, n and m rectangular loop coils, respectively. The loop coils making up each of the loop coil group 211X and the loop coil group 212Y are equidistantly arranged side by side in such a manner as to successively overlap each other.

Also, a selection circuit 213 to which the X-axis direction loop coil group 211X and the Y-axis direction loop coil group 212Y are connected is provided in the position detection device 200. The selection circuit 213 successively selects one of the loop coils of the two loop coil groups 211X and 212Y.

Further, an oscillator 221, a current driver 222, a switching connection circuit 223, a receiving amplifier 224, a detector 225, a low-pass filter 226, a sample-hold circuit 227, an analog to digital (A/D) conversion circuit 228, and a processing control section 229 are provided in the position detection device 200. The processing control section 229 includes, for example, a microcomputer.

The oscillator 221 generates an AC signal at a frequency f0. The resonance frequency of the parallel resonance circuit 40R of the position pointer 100 is selected so that the frequency f0 is a center frequency. Then, the AC signal generated by the oscillator 221 is supplied to the current driver 222. The current driver 222 converts the AC signal supplied from the oscillator 221 into a current, and supplies the current to the switching connection circuit 223. The switching connection circuit 223 switches between connection destinations (transmitting side terminal T and receiving side terminal R) to which the loop coil selected by the selection circuit 213 is connected under control of the processing control section 229. Of these connection destinations, the current driver 222 is connected to the transmitting side terminal T, and the receiving amplifier 224 is connected to the receiving side terminal R.

An induced voltage generated on the loop coil selected by the selection circuit 213 is sent to the receiving amplifier 224 via the selection circuit 213 and the switching connection circuit 223. The receiving amplifier 224 amplifies the induced voltage supplied from the loop coil and sends the amplified voltage to the detector 225.

The detector 225 detects the induced voltage generated on the loop coil, i.e., a reception signal, and sends the signal to the low-pass filter 226. The low-pass filter 226 has a cutoff frequency sufficiently lower than the above-mentioned frequency f0, converts the output signal of the detector 225 into a direct current (DC) signal, and sends the DC signal to the sample-hold circuit 227. The sample-hold circuit 227 holds the voltage value of the output signal of the low-pass filter 226 at a given timing, specifically, at a given timing during a reception period, and sends the voltage value to the A/D conversion circuit 228. The A/D conversion circuit 228 converts the analog output of the sample-hold circuit 227 into a digital signal and outputs the digital signal to the processing control section 229.

The processing control section 229 controls the selection of a loop coil by the selection circuit 213, the switching by the switching connection circuit 223, and the timing of the sample-hold circuit 227. The processing control section 229 causes an electromagnetically induced signal to be sent from the X-axis direction loop coil group 211X and the Y-axis direction loop coil group 212Y over a given transmission continuation time based on the input signal from the A/D conversion circuit 228.

An induced voltage is generated in each of the loop coils of the X-axis direction loop coil group 211X and the Y-axis direction loop coil group 212Y by the electromagnetically induced signal sent from the position pointer 100. The processing control section 229 calculates coordinate values of the position pointed to by the position pointer 100 in the X-axis direction and in the Y-axis direction based on the voltage value level of the induced voltage generated in each of the loop coils.

Also, the processing control section 229 supplies a signal to control interruption of a transmission signal and a signal for controlling a transmission signal level, and performs a process to receiving additional information from the position pointer 100, such as writing pressure data and identification information. The processing control section 229 detects an interruption signal made up of an ASK signal from the position pointer 100 as a multi-bit digital signal, and detects additional information, such as writing pressure data and identification information, as will be described later.

[Operation of Position Pointer 100 and Operation of Position Detection Device 200]A description will be given below of position detection operation and exchange of additional information between the position pointer 100 and the position detection device 200.

The position detection device 200 sends an AC signal of a transmission signal based on processing and control performed by the processing control section 229. When the position pointer 100 is not in a state to receive an AC signal from the position detection device 200 or a charging device with the parallel resonance circuit 40R, the switching circuit 405 is OFF, and the electric double layer capacitor 410 is not charged. Then, when the position pointer 100 assumes a state to receive an AC signal from the position detection device 200 or a charging device with the parallel resonance circuit 40R, the switching circuit 405 turns ON, and the electric double layer capacitor 410 is charged (power is stored in the electric double layer capacitor 410).

Then, in the position pointer 100 of the present embodiment, in the state where the first refill body 102 or the second refill body 103 does not project externally from the opening portion 101a of the housing 101 and where no writing pressure is applied to the first refill body 102 or the second refill body 103, the switching circuit 407 is ON, and the parallel resonance circuit 40R is deactivated.

When the tip 102a or the tip 103a of the first refill body 102 or the second refill body 103 projects externally from the opening portion 101a as a result of operation of the knocking operation section 120 or the knocking operation section 130 of the position pointer 100, and when a writing pressure equal to a given writing pressure value or more is applied to the writing pressure detection member 105 or the writing pressure detection member 106, the parallel resonance circuit 40R is activated. As a result, the position pointer 100 is rendered capable of receiving an AC signal with the parallel resonance circuit 40R from the position detection device 200. Then, if the position pointer 100 is placed on the sensor of the position detection device 200 by the user, the parallel resonance circuit 40R is rendered capable of receiving an AC signal from the position detection device 200 by electromagnetic inductive coupling.

Then, the switching control circuit 406 of the electronic circuit 40 of the position pointer 100 generates a switching control signal to turn ON the switching circuit 405 from the AC signal received from the sensor of the position detection device 200 by the parallel resonance circuit 40R. As a result, when the switching circuit 405 turns ON, the AC signal received by the parallel resonance circuit 40R is rectified by the rectifying circuit 404, and the electric double layer capacitor 410 is charged (power is stored in the electric double layer capacitor 410).

Figure 4:
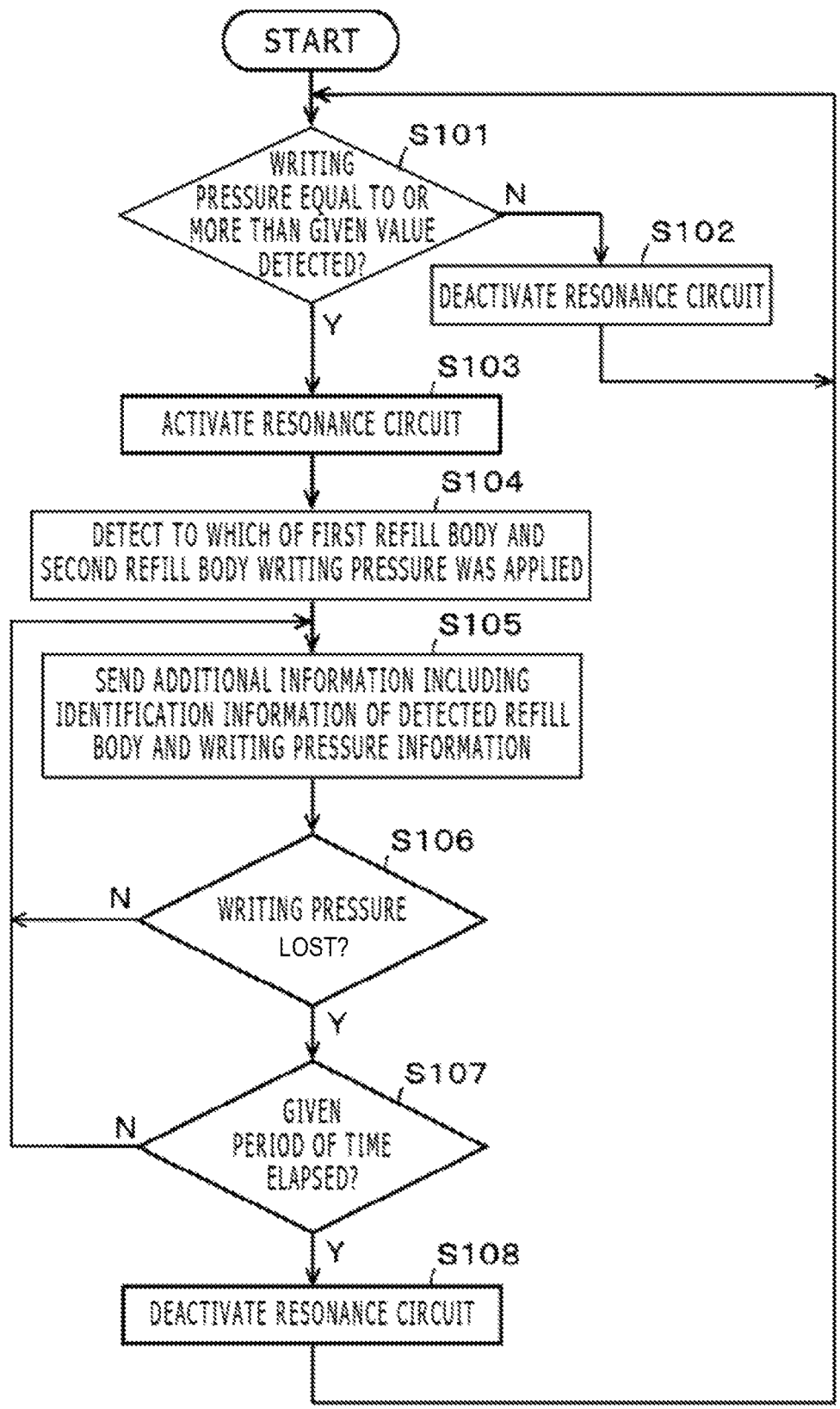
FIG. 4 is a diagram for describing an example of operation of the embodiment of the position pointer according to one aspect of the present invention.

The control circuit 400 operates on the supply voltage Vcc from the electric double layer capacitor 410. FIG. 4 is a flowchart for describing a processing operation of the control circuit 400 of the electronic circuit 40 of the position pointer 100.

The control circuit 400 monitors changes in capacitances of the variable capacitors 105C and 106C made up of the writing pressure detection members 105 and 106, respectively, and determines whether or not a writing pressure equal to a given value or more was applied to the tip 102a of the first refill body 102 or the tip 103a of the second refill body 103 (step S101). When the control circuit 400 determines that the application of a writing pressure equal to the given value or more has yet to be detected in the step S101, the control circuit 400 turns ON the switching circuit 407 to deactivate the parallel resonance circuit 40R (step S102). After the step S102, the control circuit 400 brings the process back to step S101 and repeats the processes from the step S101 onward.

In step S101, when the control circuit 400 determines that a writing pressure equal to the given value or more was applied to the tip 102a of the first refill body 102 or the tip 103a of the second refill body 103, the control circuit 400 turns OFF the switching circuit 407 to activate the parallel resonance circuit 40R (step S103). Then, next, the control circuit 400 detects the tip of which of the first refill body and the second refill body projects, by determining which of the writing pressure detection member 105 and the writing pressure detection member 106 the application of a writing pressure equal to the given value or more was detected (step S104).

When the parallel resonance circuit 40R is activated, the position pointer 100 operates such that a signal from the sensor of the position detection device 200 is received by the parallel resonance circuit 40R, and such that the received signal is fed back to the sensor of the position detection device 200. The position detection device 200 detects the position pointed to by the position pointer 100 by receiving this feedback signal from the position pointer 100. Then, as described earlier, the position detection device 200 sends a synchronizing signal to the position pointer 100 when a timing comes to receive additional information from the position pointer 100.

Based on the synchronizing signal from the position detection device 200, the position pointer 100 generates identification information of the refill body detected in step S104, identification information of the position pointer 100 itself, and the writing pressure value detected by the writing pressure detection member 105 or the writing pressure detection member 106 as additional information. Then, the control circuit 400 sends the generated additional information from the position pointer 100 to the position detection device 200 by controlling the switching circuit 407 to be ON or OFF to match with the digital value of the generated additional information (step S105). It should be noted that the control circuit 400 reads identification information of the refill body detected in step S104 from the ID memory 409.

In this case, when the switching circuit 407 is OFF, the parallel resonance circuit 40R can send the electromagnetically induced signal back to the position detection device 200 by performing resonance operation on the AC signal sent from the position detection device 200. The loop coils of the position detection device 200 receive the electromagnetically induced signal from the parallel resonance circuit 40R of the position pointer 100. In contrast, when the switching circuit 407 is ON, the parallel resonance circuit 40R is inhibited from performing resonance operation on the AC signal from the position detection device 200. Therefore, the electromagnetically induced signal is not sent from the parallel resonance circuit 40R back to the position detection device 200, and the loop coils of the position detection device 200 do not receive the signal from the position pointer 100.

In this example, the processing control section 229 of the position detection device 200 receives additional information in a multi-bit digital signal by detecting the presence or absence of a received signal from the position pointer 100 as many times as the number of bits of the additional information.

On the other hand, the control circuit 400 of the position pointer 100 generates a multi-bit digital signal that matches with the additional information to be sent, and controls the switching circuit 407 to be ON or OFF in synchronism with transmission or reception of an electromagnetically induced signal to or from the position detection device 200 using the multi-bit digital signal. For example, when the additional information bit is "0," the switching circuit 407 is turned ON. Then, as described earlier, an electromagnetically induced signal is not sent back to the position detection device 200 from the position pointer 100. On the other hand, when the additional information bit is "1," the switching circuit 407 is turned OFF. Then, as described earlier, an electromagnetically induced signal is sent back to the position detection device 200 from the position pointer 100.

Therefore, the processing control section 229 of the position detection device 200 can receive additional information, as a digital signal, by detecting the presence or absence of a received signal from the position pointer 100 as many times as the number of bits of the additional information.

Next, the control circuit 400 monitors the change in writing pressure based on the capacitance of the variable capacitor 105C or the variable capacitor 106C made up of the writing pressure detection member 105 or the writing pressure detection member 106, and determines whether or not a writing pressure equal to the given value or more is no longer applied and is lost (step S106). When the control circuit 400 determines in the step S106 that a writing pressure is applied and is not lost, the control circuit 400 brings the process back to step S105 and repeats the processes from the step S105 onward.

Also, when the control circuit 400 determines in step S106 that a writing pressure is no longer applied and is lost, the control circuit 400 determines whether or not the loss of a writing pressure has continued for a given period of time or more, for example, for 10 seconds or more (step S107). When the control circuit 400 determines that the loss of a writing pressure has not continued for a given period of time or more, the control circuit 400 brings the process back to step S105 and repeats the processes from the step S105 onward. When the control circuit 400 determines that the loss of a writing pressure has continued for a given period of time or more, the control circuit 400 turns ON the switching circuit 407 to deactivate the parallel resonance circuit 40R (step S108). After the step S108, the control circuit 400 brings the process back to step S101 and repeats the processes from the step S101 onward.

The transmission of additional information was not immediately stopped when the control circuit 400 determined in step S107 that a writing pressure was no longer applied and was lost, in consideration of a case in which, although the user continues to make input on the sensor surface of the position detection device 200 by the position pointer 100, the user temporarily detaches the position pointer 100 from the sensor surface.

In the position pointer 100 according to the above embodiment, when the tip 102a of the ballpoint pen refill as the first refill body 102 projects, and when the ballpoint pen refill as the first refill body 102 draws on a sheet of paper arranged on the sensor of the position detection device, the position detection device 200 can detect the drawing path as a detection result of the pointed position. Therefore, it is possible to draw on a piece of paper and at the same time acquire electronic data of drawing information (pointed position data).

Also, if a display screen is laid over the sensor of the position detection device 200, it is possible to bring the tip of the refill body into contact with the display screen without any problem and make position input with the position pointer 100 by causing the electronic pen refill as the second refill body 103 to project.

In the position pointer 100 according to the above embodiment, the refill bodies need not be configured as a cartridge having a writing pressure detection member and a circuit component, and a ballpoint pen refill or electronic pen refill made of resin can be used in an 'as-is' fashion. Therefore, the position pointer 100 according to the above embodiment can be configured at low cost, and the cost for replacing the refill is also low.

[Modification Example of Above Embodiment]

Although, in the above embodiment, a ballpoint pen refill was used as the first refill body 102 and an electronic pen refill was used as the second refill body 103, any kinds of refill bodies may be used as the first refill body and the second refill body. For example, ballpoint pen refills may be used as the first refill body 102 and the second refill body 103. In that case, black ink can be used for the ballpoint pen refill of the first refill body 102, and red ink can be used for the ballpoint pen refill of the second refill body 103. Then, because the position detection device can receive identification information of the first refill body 102 and the second refill body 103, it is possible to recognize the drawing color for electronic data of drawing information of each of the ballpoint pen refills (pointed position data) based on that identification information and include that in the electronic data.

Also, electronic pen refills may be used as the first refill body 102 and the second refill body 103. In that case, it is possible to identify functions, such as display colors, line types, and line thicknesses, assigned to the electronic pen refills of the first refill body 102 and the second refill body 103 as the position detection device receives identification information of the first refill body 102 and the second refill body 103 from the position pointer 100 as additional information.

It should be noted that it is not a mandatory requirement for the position pointer of the present invention to send identification information of the first refill body and the second refill body to the position detection device as additional information. There is a case in which uses are restricted and in which it is not necessary for the position detection device to recognize the tip of which of the refill bodies projects as in the case of the above embodiment in which a ballpoint pen refill was used as the first refill body 102 and an electronic pen refill was used as the second refill body 103.

Although, in the above embodiment, the resonance circuit was activated only when a writing pressure equal to a given value or more was detected by the writing pressure detection member, the resonance circuit may be constantly activate. In that case, it is possible for the position detection device to detect the position of the position pointer 100 also when the position pointer 100 is in a hovering state before coming into contact with the sensor of the position detection device.

Also, although, in the above embodiment, a writing pressure value detected by the writing pressure detection member was used to detect the tip of which of the first refill body and the second refill body projects externally from the opening portion 101a, the present invention is not limited thereto. For example, a sensor member may be provided on a portion of the refill body holder 104 to detect the sliding movement of the first refill body and the second refill body.

Also, in the above embodiment, separate writing pressure detection members were provided, one for each of the first refill body and the second refill body. However, if which of the first refill body and the second refill body projects externally from the opening portion 101a is not detected from a writing pressure value, a common writing pressure detection member may be provided for the first refill body and the second refill body. For example, a single common writing pressure detection member may be provided on a portion of the stopper 140, and a pressing pressure transfer member may be provided that has recess portions that fit to the cutout groove 124 and the cutout groove 134 of the knocking operation section 120 and the knocking operation section 130, respectively, and that a pressing pressure transfer member may be fitted to the single common writing pressure detection member.

[Other Embodiment]

Although the above embodiment is a case in which an electromagnetic inductive position pointer was used, the present invention is applicable to so-called active capacitive position pointers having a signal transmission circuit. In that case, a resonance circuit that includes the coil 162 wound around the ferrite core 161 and the capacitor 401 provided on the printed circuit board 150 makes up part of an electromagnetic inductive charging circuit, and the signal transmission circuit is driven by a supply voltage from a charging-type battery.

Figure 5:
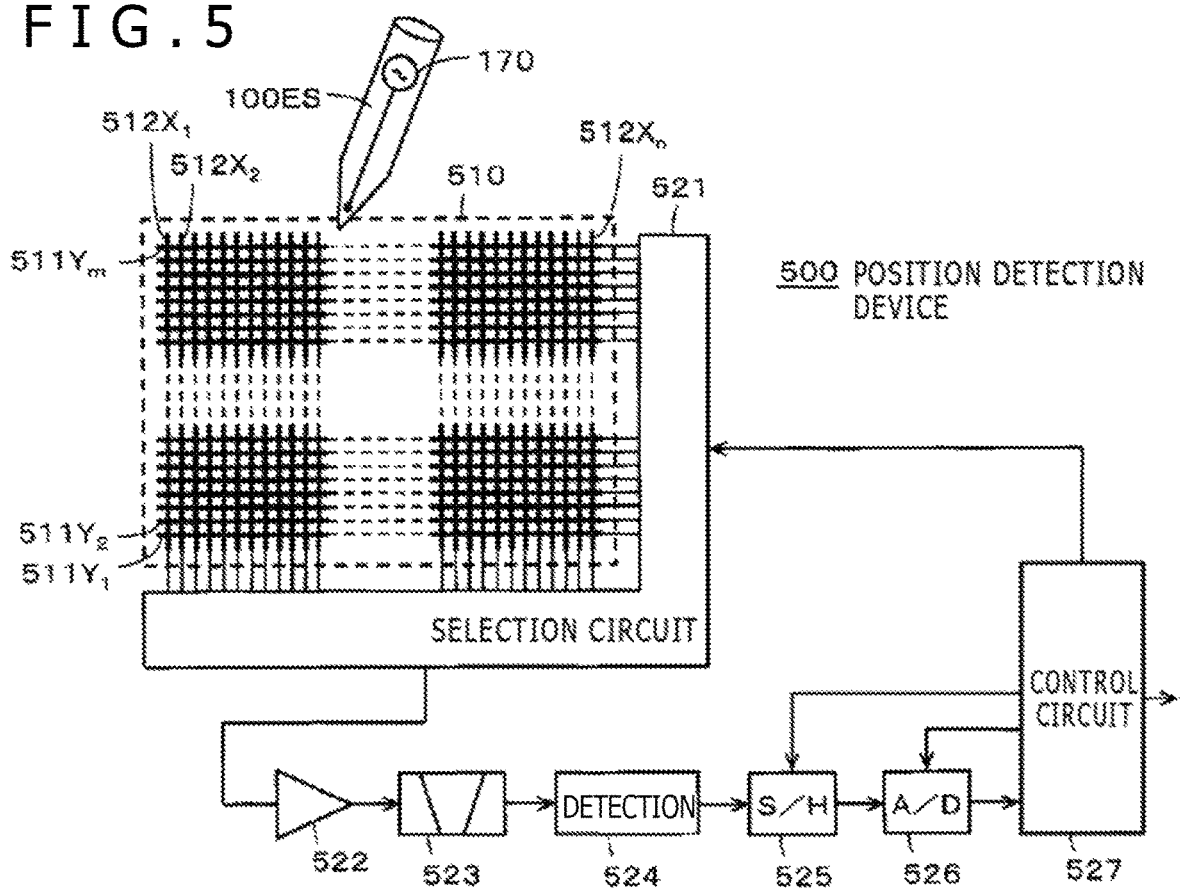
FIG. 5 is a diagram used to describe another embodiment of the position pointer according to one aspect of the present invention.

FIG. 5 is a diagram illustrating a circuit configuration example of an active capacitive position pointer 100ES and a position detection device 500 used together with the position pointer 100ES concerned. The position pointer 100ES includes a charging-type battery (not shown) and a signal transmission circuit 170. This signal transmission circuit 170 includes a control circuit that matches with the control circuit 400 of the position pointer 100 according to the above embodiment.

The signal transmission circuit 170 incorporates an oscillator (not shown), and a transmission signal from the signal transmission circuit 170 is sent to the position detection device 500 through a refill body, specifically a conductor. Therefore, each of the refill bodies includes a conductor in the case of the position detection device in this example.

In the position pointer 100 of the above embodiment, the parallel resonance circuit 40R is used to exchange signals with the position detection device 200. In contrast, the position pointer 100ES in this example is different in that signals are sent from the signal transmission circuit 170 through a refill body whose tip projects externally from the opening portion 101a of the housing 101 selectively using the refill body selection mechanism. The position pointer 100ES is configured in the same manner as the position pointer 100 in all other respects. In the description given below, the same components as those of the position pointer 100 of the above embodiment are denoted by the same reference symbols.

A sensor 510 of the position detection device 500 that exchanges signals as a result of capacitive coupling with the position pointer 100ES in this example is configured to receive signals sent from the position pointer 100ES using a sensor pattern formed by causing a first conductor group and a second conductor group to intersect each other as illustrated in FIG. 5, detect the position pointed to by the position pointer 100ES, and receive additional information.

The first conductor group has a plurality of first conductors $511Y_1$, $511Y_2$, and so on up to $511Y_m$ (where m is an integer equal to one or more) that extend, for example, horizontally (in the X-axis direction) and that are arranged in the Y-axis direction in parallel with a given spacing therebetween.

On the other hand, the second conductor group has a plurality of second conductors $512X_1$, $512X_2$, and so on up to $512X_n$ (where n is an integer equal to one or more) that extend in a direction orthogonal to the direction of extension of the first conductors $511Y_1$, $511Y_2$, and so on up to $511Y_m$, and, in this case, vertically (in the Y-axis direction) and that are arranged in the X-axis direction in parallel with a given spacing therebetween.

The position detection device 500 includes a selection circuit 521 used as an input/output (I/O) interface with the sensor 510, an amplifying circuit 522, a band-pass filter 523, a detection circuit 524, a sample-hold circuit 525, an AD conversion circuit 526, and a control circuit 527.

The selection circuit 521 selects one conductor from each of the first conductor group and the second conductor group based on a control signal from the control circuit 527. The conductors selected by the selection circuit 521 are connected to the amplifying circuit 522, and a signal from the position pointer 100ES is detected by the selected conductors and amplified by the amplifying circuit 522. The output of the amplifying circuit 522 is supplied to the band-pass filter 523, and only the frequency component of the signal sent from the position pointer 100ES is extracted.

The output signal of the band-pass filter 523 is detected by the detection circuit 524. The output signal of the detection circuit 524 is supplied to the sample-hold circuit 525 and sampled and held at a given timing thanks to a sampling signal from the control circuit 527, and then converted into a digital value by the AD conversion circuit 526. Digital data from the AD conversion circuit 526 is read and processed by the control circuit 527.

Because of the program stored in the internal read-only memory (ROM), the control circuit 527 operates in such a manner as to send a control signal to each of the sample-hold circuit 525, the AD conversion circuit 526, and the selection circuit 521. Also, the control circuit 527 calculates position coordinates on the sensor 510 pointed to by the position pointer 100ES from digital data from the AD conversion circuit 526. Also, the control circuit 527 demodulates additional information sent from the position pointer 100ES from the digital data from the AD conversion circuit 526.

Figure 6:
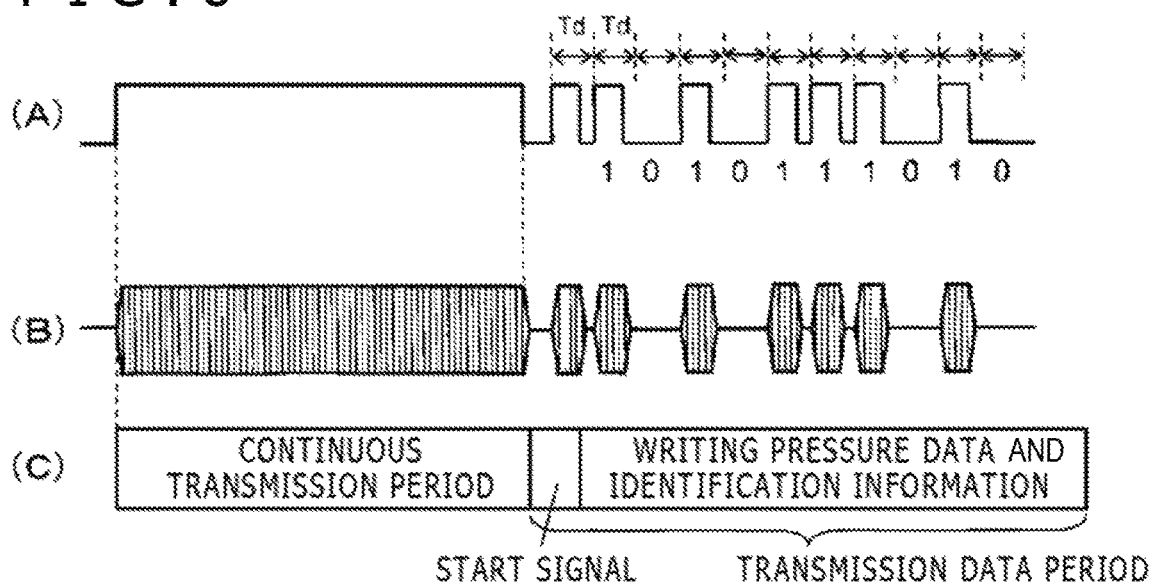
FIG. 6 depicts diagrams used to describe another embodiment of the position pointer according to one aspect of the present invention.

FIG. 6 depicts timing charts for describing a signal having a given pattern from the transmission-type position pointer 100ES of the present embodiment received by the sensor 510 of the position detection device 500. In the position pointer 100ES of the present embodiment, the control circuit of the signal transmission circuit 170 repeatedly outputs a signal having a given pattern made up of a position detection signal and additional information.

FIG. 6(A) illustrates an example of a control signal from the control circuit of the signal transmission circuit 170. For a fixed time period during which the control signal is maintained at high level, a transmission signal from the signal transmission circuit 170 is continuously sent as a burst signal as illustrated in FIG. 6(B) (continuous transmission period in FIG. 6(C)).

During this continuous transmission period, the control circuit of the signal transmission circuit 170 detects the writing pressure value applied to the refill body whose tip projects externally from the opening portion 101a in the same manner as described for the position pointer 100 of the above embodiment as a value that matches with the capacitances of the variable capacitors 105C and 106C made up of the writing pressure detection members 105 and 106, and finds the writing pressure value thereof as a multi-bit value such as 10-bit value (binary code).

The control circuit of the signal transmission circuit 170, following a start signal, controls the signal transmission circuit 170 such that multi-bit additional information similar to that of the above-described position pointer 100 is sequentially sent. The control circuit of the signal transmission circuit 170 repeatedly sends a signal having a pattern made up of a continuous transmission period and a transmission data period as described above.

As described above, according to the position pointer 100ES in this example, it is also possible to obtain the same operational advantage from a capacitive transmission-type electronic pen as from the position pointer 100 of the above embodiment.

It should be noted that when the signal transmission circuit is provided in the above-described electronic circuit 40 and when the projection of the tip of the refill body made of a conductor externally from the opening portion 101a of the housing 101 is detected, it is possible to configure the position pointer so as to support two schemes of a capacitive scheme and an electromagnetic inductive scheme by configuring the position pointer such that a signal from the signal transmission circuit of the electronic circuit 40 is sent through the conductive refill body whose tip projects externally.

[Other Embodiment and Modification Example]

It should be noted that, although, in the above embodiment, the writing pressure detection members included variable capacitors whose capacitances vary in accordance with the writing pressures and that use writing pressure detection means having a known configuration described in Japanese Patent Laid-Open No. 2011-186803, Patent Document, the present invention is not limited thereto. The writing pressure detection members may include semiconductor elements whose capacitances vary in accordance with the writing pressures as disclosed, for example, in Japanese Patent Laid-Open No. 2013-161307.

Also, although, in the above embodiment, two refill bodies were accommodated in the housing, it is a matter of course that two or more refill bodies may be accommodated.

The invention claimed is:

1. A position pointer, comprising:
a tubular housing having an opening;
a plurality of refill bodies in the tubular housing;
a magnetic material core positioned adjacent to the opening of the tubular housing, the magnetic material core having a through hole;
a coil wound around the magnetic material core;
a capacitor, the capacitor and the coil forming a resonance circuit;
a refill body selector which, in operation, projects at least a tip of a selected refill body of the plurality of refill bodies from the opening, extends the selected refill body through the through hole of the magnetic material core, and spaces an unselected refill body of the plurality of refill bodies away from the magnetic core;
a plurality of writing pressure detectors, each of the plurality of writing pressure detectors being coupled to a respective refill body of the plurality of refill bodies at a side of the respective refill body that is opposite to a tip of the respective refill body, each of the plurality of writing pressure detectors, in operation, detects a pressure applied to the respective refill body; and
a control circuit configured to activate the resonance circuit in response a pressure equal to or greater than a predetermined value being detected by any one of the plurality of writing pressure detectors, and deactivate the resonance circuit in response to the pressure equal to or greater than the predetermined value not being detected by all of the plurality of writing pressure detectors.

2. The position pointer of claim 1, wherein
the through hole of the magnetic material core has a first diameter on a first side and a second diameter on a second side that is opposite to the first side, the first side being closer to the opening of the tubular housing than the second side, the first diameter being smaller than the second diameter.

3. The position pointer of claim 2, wherein
the through hole of the magnetic material core has a tapered shape such that the through hole becomes gradually smaller as the through hole approaches the opening of the tubular housing.

4. The position pointer of claim 2, wherein
the plurality of refill bodies are configured to warp in such a manner as to be inserted through the through hole of the magnetic material core while at the same time being guided onto an inner wall surface of the through hole.

5. The position pointer of claim 1, further comprising:
a fastening member spaced from the opening of the tubular housing by the magnetic material core, the fastening member fastening the magnetic material core to the tubular housing, the fastening member having a through hole, the through hole of the fastening member having a first diameter on a first side and a second diameter on a second side that is opposite to the first side, the first side being closer to the magnetic material core that the second side, the first diameter being smaller than the second diameter.

6. The position pointer of claim 1, wherein
at least one of the plurality of refill bodies is a ballpoint pen refill that contains an ink.

7. The position pointer of claim 1, wherein
at least one of the plurality of refill bodies is made of a resin material.

8. The position pointer of claim 7, wherein
the refill body made of a resin material has substantially the same magnetic permeability as a ballpoint pen refill.

9. The position pointer of claim 1, wherein
the resonance circuit is active in response to at least the tip of a selected refill body being projected from the opening of the tubular housing.

10. The position pointer of claim 1, further comprising:
a circuit which, in operation, sends signals through a refill body of the plurality of refill bodies that is made of a conductive material.

11. The position pointer of claim 1 wherein the plurality of writing pressure detectors are coupled to the coil and the capacitor.

12. The position pointer of claim 1 wherein the control circuit is configured to detect which of the plurality of refill bodies is the selected refill body based on pressures detected by the plurality of writing pressure detectors, and transmit information of the selected refill body in response to detecting the selected refill body.

13. The position pointer of claim 12 wherein the selected refill body is coupled to a writing pressure detector of the plurality of writing pressure detectors that detects the pressure equal to or greater than the predetermined value.

14. The position pointer of claim 12 wherein the information of the selected refill body includes identification information of the selected refill body and writing pressure information of the selected refill body.

* * * * *